J. TROPEK.
AUGER.
APPLICATION FILED MAR. 3, 1915.

1,160,675. Patented Nov. 16, 1915.

Inventor
J. Tropek

Witnesses
John Gogalak
Milton E. Lowry

By
N. M. Wilson
Attorney

UNITED STATES PATENT OFFICE.

JOSEPH TROPEK, OF NOBLESTOWN, PENNSYLVANIA.

AUGER.

1,160,675.  Specification of Letters Patent.  Patented Nov. 16, 1915.

Application filed March 3, 1915. Serial No. 11,703.

*To all whom it may concern:*

Be it known that I, JOSEPH TROPEK, a subject of the King of Hungary, residing at Noblestown, in the county of Allegheny and State of Pennsylvania, have invented certain new and useful Improvements in Augers, of which the following is a specification.

This invention relates to certain new and useful improvements in augers.

An object of the invention is to provide an auger that is adapted to cut a square hole and in which the main cutting member is arranged in advance of the auxiliary cutting members.

A further object of the invention is to provide an auger that is adapted to cut a square hole and in which an auger of the usual construction is associated with a casing carrying cutters that are right-angularly disposed whereby a square hole may be cut, while the main auger constitutes the guiding means for the angularly-disposed cutters.

With the above general objects in view and others that will appear as the nature of the invention is better understood, the same consists in the novel construction, combination and arrangement of parts to be hereinafter more fully described and then claimed.

Figure 1:
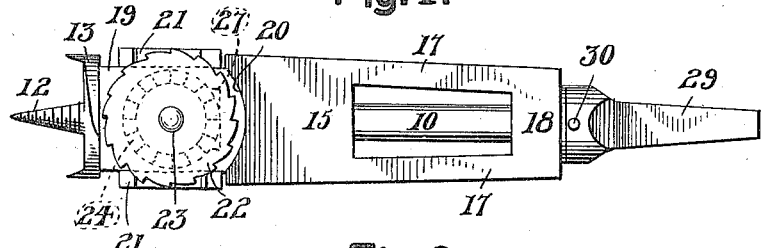
Figure 2:
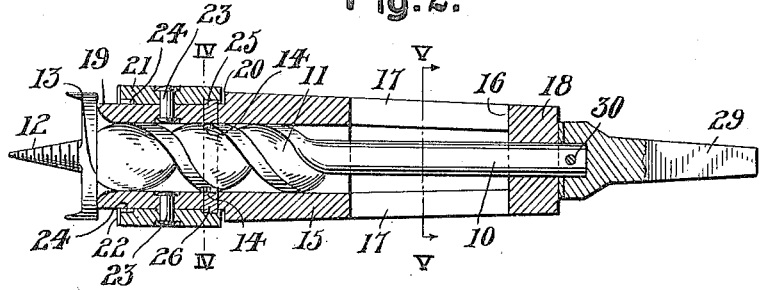
Figure 3:
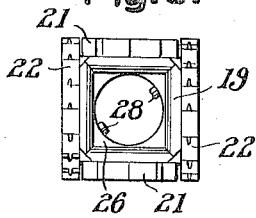
Figure 4:
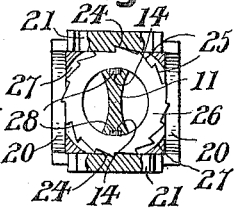
Figure 5:
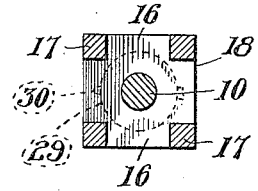
Figure 6:
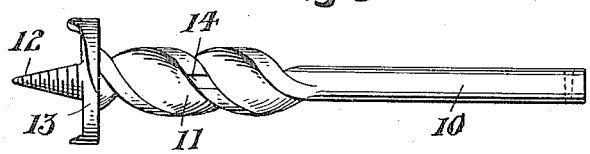
Figure 7:

In the accompanying drawing which shows the preferred embodiment of the present invention and to which reference is had herein by like characters designating corresponding parts throughout the several views:—Figure 1 is a side elevational view of an auger built in accordance with the present invention. Fig. 2 is a longitudinal sectional view of the same. Fig. 3 is a front end elevational view of the device with the main cutting auger removed. Fig. 4 is a cross-sectional view taken on line IV—IV of Fig. 2. Fig. 5 is a cross-sectional view taken on line V—V of Fig. 2. Fig. 6 is a side elevational view of the main cutting auger removed from the casing, and, Fig. 7 is a detail perspective view of the driving wheel for the side cutters.

Briefly described, the present invention includes a main auger and an auxiliary cutting member and wherein the main auger constitutes a driving means for the auxiliary cutters. The auxiliary cutter comprises a casing for inclosing the main auger and which casing supports right-angularly disposed auxiliary cutters associated in a manner with the main cutter whereby a square hole is adapted to be cut.

Referring more in detail to the accompanying drawing, and particularly to Fig. 6, the reference numeral 10 designates the tang or shank of the main cutter that includes the usual spiral portion 11 and the threaded tapered end 12 and is provided between the threaded end 12 and the spiral portion 11 with the cutting head 13. This auger differs from the usual type of wood auger in that the cutting head 13 is of increased diameter relative to the whirls 11 while the whirls 11 are provided with notches 14 on opposite sides thereof for purposes to be later described.

The casing constituting the support for the auxiliary cutting means includes the body-portion 15 of hollow construction, rectangular in cross-section and having the sides thereof adjacent the rear end cut away as at 16 to provide corner posts 17 and has a rear integral connection 18. The forward end of the casing 15 is reduced in cross-sectional area to provide a collar portion 19 while the rear ends of the collar portion on each side of the casing 15 is provided with a curved recess 20 to provide a clearance for the auxiliary cutters to be later described.

The auxiliary cutters are carried by the collar 19 and are designated 21, one of these cutters being carried by each side of the collar and arranged at right angles to enable a square hole to be cut, while the peripheries of the cutting wheels 21 are provided with teeth 22 as clearly illustrated. The cutting wheels 21 are held in position on the collar 19 by the pins 23 passing through the wheel and collar, with the heads swaged as shown in Fig. 2, the pins being centrally disposed of the wheels so that the cutting wheels may be revolved.

Rack teeth 24 are arranged in circular series as shown by dotted lines in Fig. 1 on the inner face of each of the cutting wheels 21, and adapted to mesh with these teeth 24 are the teeth 25 of the driving wheel 26. Each side face of the collar 19 is cut-away as at 27 to provide a clearance for the projecting teeth of the driving wheel 26, as clearly shown in Figs. 2 and 4. The driving wheel 26 is in the form of a ring with inwardly projecting oppositely-disposed pins 28 carried thereby, and in assembled position of the main cutter 10 and the casing 15, the said pins 28 are adapted to be received in the recesses or notches 14 provided in the whirls of the cutter 10, this connection being clearly illustrated in Fig. 4. In this position, the rear end of the tang 10 projects through the rear end of the cutter 15 as illustrated in Fig. 2, and has mounted on the projecting end thereof the driving head 29 locked thereto as by the pin 30.

The operation will be described as follows: It being desirous of boring a square hole, the main auger 10 and casing 15 are assembled in the position shown and the driving head 29 operated to impart rotary motion to the shank 10, this motion being communicated to the whirls 11, tapered threaded end 12, and the main cutting head 13. The main cutting head 13 feeds the auger through the object and cuts a circular opening, while this rotary motion is imparted to the auxiliary cutters 21 through the medium of the driving wheel 26 connected to the whirls and engaging teeth on the inner face of the said auxiliary cutters. These cutters 21 revolve in an obvious manner, and being arranged at right angles cause a square hole to be cut.

While I have shown and described the preferred embodiment of the present invention, I do not wish to confine myself to the exact details, as various forms, modifications and arrangements of the parts may be had without departing from the spirit and scope of the invention as claimed.

What I claim as new is:—

A device of the class described, comprising an auger including whirls, the opposite sides of the whirls having a pair of alined notches therein, a rectangular casing inclosing the auger, a rotary cutter carried by each face of the outer end of the casing, rack teeth arranged in circular series on the inner face of each cutter, a driving wheel carried by the casing in mesh with the rack teeth of each cutter, inwardly-directed pins carried by the driving wheel received in said auger notches, and means for revolving the auger whereby the driving wheel and cutters are operated.

In testimony whereof I affix my signature in presence of two witnesses.

JOSEPH TROPEK.

Witnesses:
  Jos. Hubik,
  Stefan Vorns.

Copies of this patent may be obtained for five cents each, by addressing the "Commissioner of Patents Washington, D. C."